(12) United States Patent
Lopez et al.

(10) Patent No.: US 8,219,481 B2
(45) Date of Patent: Jul. 10, 2012

(54) SYSTEMS AND METHODS FOR ALLOCATING SIZE AMONG TRADING ACCOUNTS

(75) Inventors: Scott Lopez, Winchester, MA (US);
Charles Argyle, Milton, MA (US);
William D. Goldenthal, Wellesley, MA (US); David Goddeau, Watertown, MA (US)

(73) Assignee: Wellington Management Company, LLP, Boston, MA (US)

( * ) Notice: Subject to any disclaimer, the term of this patent is extended or adjusted under 35 U.S.C. 154(b) by 501 days.

(21) Appl. No.: 12/332,659

(22) Filed: Dec. 11, 2008

(65) Prior Publication Data
US 2009/0094152 A1 Apr. 9, 2009

Related U.S. Application Data

(63) Continuation-in-part of application No. 12/214,551, filed on Jun. 18, 2008, now abandoned.

(60) Provisional application No. 60/936,445, filed on Jun. 19, 2007.

(51) Int. Cl.
*G06Q 40/00* (2006.01)

(52) U.S. Cl. ............. 705/37; 705/35; 705/36; 705/7.13; 709/226

(58) Field of Classification Search .............. 705/35–37, 705/7.13; 709/226
See application file for complete search history.

(56) References Cited

U.S. PATENT DOCUMENTS

| | | | |
|---|---|---|---|
| 7,246,093 B1 * | 7/2007 | Katz | 705/37 |
| 7,853,499 B2 * | 12/2010 | Czupek et al. | 705/35 |
| 2002/0138389 A1 * | 9/2002 | Martone et al. | 705/36 |

* cited by examiner

*Primary Examiner* — Harish T. Dass
(74) *Attorney, Agent, or Firm* — Ropes & Gray LLP

(57) ABSTRACT

A system and method for allocating trades of financial instruments among multiple accounts comprising aggregating orders, wherein each order is associated with an account, and wherein each order has an original order size; allocating an executed order based on the aggregated order in a phase I allocation, wherein the phase I allocation is allocated on a pro-rata basis based on the original order size for each account, except for those accounts that would receive an amount less than a minimum allocation; allocating a remainder from the phase I allocation in a phase II allocation, wherein the phase II allocation is allocated among selected accounts in an amount greater than or equal to the minimum allocation or an amount that fills the original order size; repeating the phase II allocation until a remainder from the phase II allocation is less than the minimum allocation; and allocating a reminder from the phase II allocation in a phase III allocation according to predetermined criteria.

31 Claims, 3 Drawing Sheets

FIG. 2

Solve for Min = 50,000

Total Order: 2,710,000

Executed: 750,000 @ $1.00

| A/C | Order Qty | ProRata% | Phase I (ProRata) |
|---|---|---|---|
| A | 1,000,000 | 0.3690 | 276,750 |
| B | 500,000 | 0.1845 | 138,375 |
| C | 400,000 | 0.1476 | 110,700 |
| D | 200,000 | 0.0738 | 55,350 |
| E | 200,000 | 0.0738 | 55,350 |
| F | 150,000 | 0.0554 | 41,550 |
| G | 100,000 | 0.0369 | 27,675 |
| H | 75,000 | 0.0277 | 20,750 |
| I | 40,000 | 0.0148 | 11,100 |
| J | 25,000 | 0.0092 | 6,900 |
| K | 10,000 | 0.0037 | 2,750 |
| L | 10,000 | 0.0037 | 2,750 |
| | 2,710,000 | 100.00 | 750,000 |

Phase II (Random Distribution)

| | | | | | | | | |
|---|---|---|---|---|---|---|---|---|
| 3 | 113,475 | | 2 | 63,475 | | 0 | 53,475 | |
| 2 | 50,000 | | 1.5 | | | 2 | 50,000 | |
| 1.5 | | | 1 | | | 1.5 | | |
| 1 | | | 1 | | | 1 | | |
| 1 | | | 1 | 10,000 | | 1 | | |
| 1 | | | 1 | | | 0 | | |
| 1 | 63,475 | | 1 | 53,475 | | 1 | 3,475 | |

Phase III

| | | Allocation | Δ |
|---|---|---|---|
| | | 276,750 | 0 |
| | | 138,375 | 0 |
| | | 110,700 | 0 |
| | | 55,350 | 0 |
| | | 55,350 | 0 |
| 0.66 | 3,475 | 52,325 | +11k |
| 0.33 | 2,325 | 51,150 | +24k |
| | 1,150 | 0 | −20k |
| | | 0 | −11k |
| | | 0 | −7k |
| | | 10,000 | +7k |
| | 0 | 0 | −3k |
| | | 750,000 | 0 |

SYSTEMS AND METHODS FOR ALLOCATING SIZE AMONG TRADING ACCOUNTS

CROSS-REFERENCE TO RELATED APPLICATIONS

This application is a continuation-in-part of U.S. patent application Ser. No. 12/214,551, filed on Jun. 18, 2008, which claims priority to U.S. Provisional Patent Application No. 60/936,445 filed on Jun. 19, 2007.

FIELD OF THE INVENTION

The present invention relates to systems and methods for allocating size among trading accounts in an aggregated order on a modified pro-rata basis.

BACKGROUND OF THE INVENTION

The present invention generally applies to situations in which two or more trading accounts participate simultaneously in an aggregated order involving the same financial or other instrument. More specifically, such situations typically involve accounts that are on the same side of a trade to be executed.

After orders to purchase or sell an instrument for different accounts are placed, they may be aggregated and a trade may be executed for a total size of the instrument. Traditionally, the total size is allocated among the accounts on a pro-rata basis based on the order size for each account. In most instances, a pro-rata allocation achieves fairness among the accounts involved in the trade. However, because the total size traded is often less than the aggregate order sizes for the accounts, such as when the original order size is not available, some accounts may receive an allocation that is disproportionate to the incurred transaction cost when a strict pro-rata allocation is applied. Typically, the affected accounts are associated with smaller order sizes when compared to other accounts participating in the aggregated order.

Accordingly, it would be desirable to modify a pro-rata allocation method so that these accounts are not systematically charged transaction costs when trades are executed for orders involving the accounts. At the same time, it would be desirable to modify the pro-rata allocation method in a manner that is fair and equitable to all trading accounts.

SUMMARY OF THE INVENTION

A method for allocating trades of financial instruments among multiple accounts comprises aggregating orders, wherein each order is associated with an account, and wherein each order has an original order size. The method further comprises allocating an executed order based on the aggregated order in a phase I allocation, wherein the phase I allocation is allocated on a pro-rata basis based on the original order size for each account, except for those accounts that would receive an amount less than a minimum allocation. The method further comprises allocating a remainder from the phase I allocation in a phase II allocation, wherein the phase II allocation is allocated among selected accounts in an amount greater than or equal to the minimum allocation or an amount that fills the original order size; repeating the phase II allocation until a remainder from the phase II allocation is less than the minimum allocation. The method further comprises allocating a reminder from the phase II allocation in a phase III allocation according to predetermined criteria.

DESCRIPTION OF THE FIGURES

For the present invention to be understood clearly and readily practiced, the present invention will be described in conjunction with the following figures, wherein:

FIG. 2 is a tabular diagram of an exemplary trade scenario that illustrates allocating size among trading accounts according to an embodiment of the present invention.

DESCRIPTION OF THE INVENTION

The present invention provides an algorithm for allocating size among trading accounts in an aggregated order on a modified pro-rata basis so as to minimize transaction costs in a manner that is fair and equitable to all trading accounts.

In the following discussion of illustrative embodiments, the terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The term "based on," as used in the claims and specification herein, is not exclusive and allows for being based on additional factors that may or may not be described.

Figure 1:
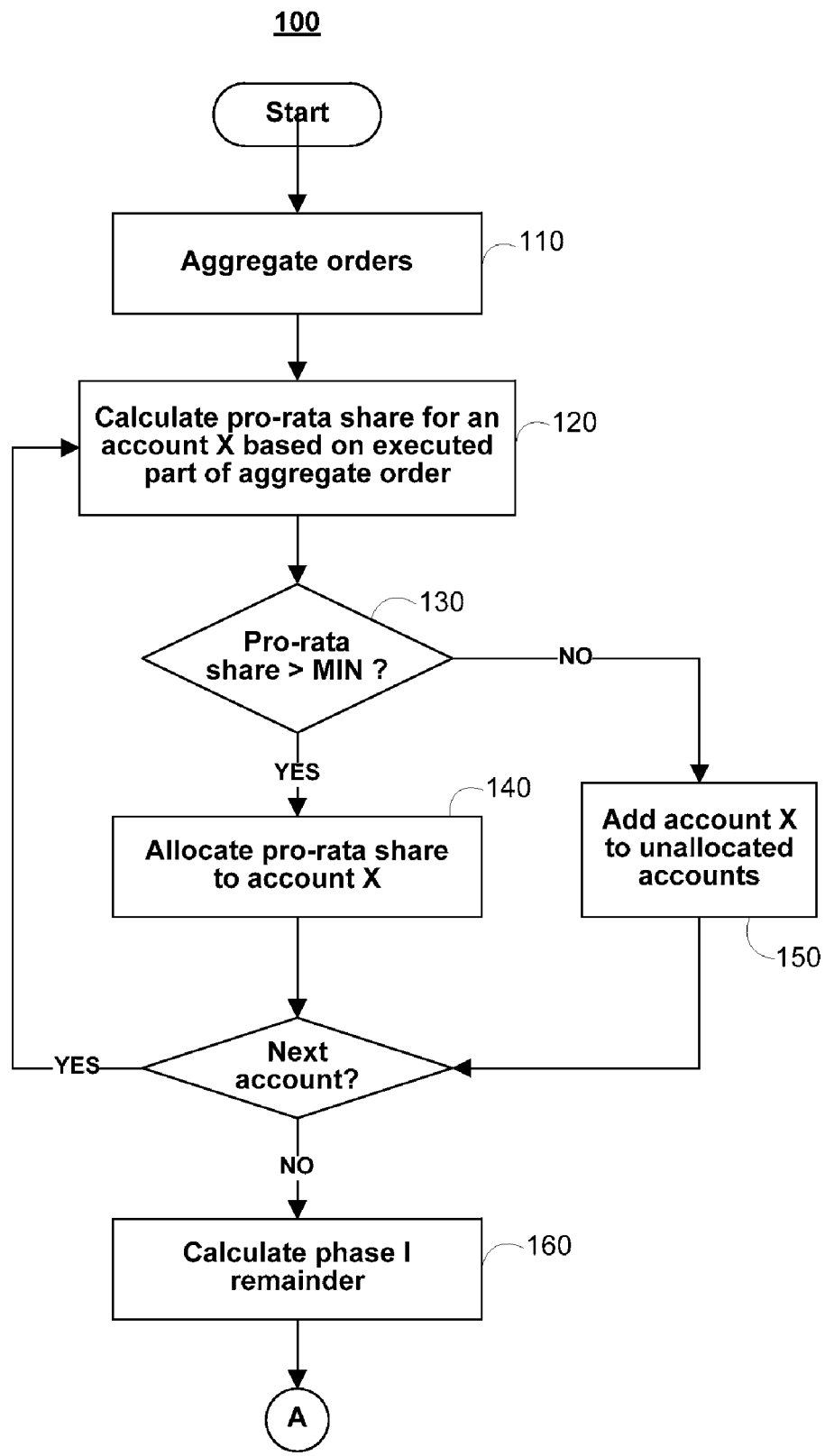
FIG. 1 is a process diagram that illustrates phase I of an exemplary method for allocating size among trading accounts according to an embodiment of the present invention.

FIG. 1 is a process diagram that illustrates an exemplary method 100 for allocating size among trading accounts according to an embodiment of the present invention. In step 110, orders involving the purchase or sale of the same instrument for more than one account may be aggregated before a trade is executed on the instrument. The instruments that are traded may be securities instruments such as equities, fixed-income securities, any other financial instruments, or may include other instruments such as commodities or other goods. Orders for more than one account involving the purchase or sale of such an instrument on substantially similar terms may be aggregated. This may be especially true when the orders have similar trading criteria (e.g., similar price limits and times of receipt).

A single block order may then be placed with, for example, one or more brokers. The block order may be placed after it is determined that such an aggregation is consistent with seeking best price and execution and is in the best interests of the clients to which the accounts pertain. In determining whether the aggregation of an order is appropriate, different factors may be considered. Such factors may include the time frame over which different portfolio managers wish to build up or trim a position, price limits and other guidelines established by a portfolio manager on a specific order for an account, client cash flows, the liquidity of the instrument involved, and other relevant inputs.

Additional orders such as new, or follow-on, orders may also be added to the block order if the orders are received within a reasonable period of time and/or it is reasonably believed that the addition of the orders will not have a material adverse impact on the original block order. In addition, follow-on orders may be added to a block order if it is known or can be reasonably inferred that the additional orders are based on the same event or analyst recommendation that prompted the original order. Alternatively, the block order may be closed out, thereby allocating the executions already received to the participants in that block order, and creating a new block order before continuing trading.

Account restrictions, such as operational rules, broker selection requirements, or limitations on minimum transaction amounts may require that certain orders be traded separately from the aggregate order. Program orders (i.e., broadly-based lists of orders intended to be executed in a coordinated fashion) and orders routed to automated execution channels may be traded separately from other orders in situations where those program or automated orders may not have a material impact on other orders or where aggregation of orders is not considered necessary or appropriate in the interests of fairness to all accounts. Similarly, orders may be placed in full or partial funding or liquidation separately from other orders in situations where aggregation of orders may not be necessary or appropriate in the interest of fairness to all accounts.

In step 120 of FIG. 1, a pro-rata share of the executed order may be calculated for each account participating in the block order. At the time the block order is placed, the size of the financial instrument to be traded may be specified for each participating account. Except as provided in the following paragraphs, the executed portion of an order through a specific broker/dealer combining two or more accounts, may be on a pro-rata basis (to the nearest minimum lot size or round trading lot). Accordingly, each account involved may receive a percentage of the executed portion of the order (also referred to as size traded) based upon the size ratio of the individual order to the block order. When equity securities are involved, efforts may be made to use a single average price in the allocations. Such an allocation may apply to transactions in private placement securities. For trades in fixed income instruments, each account may receive a similar pro-rata allocation at each executed market level. The same procedure may be applied to new fixed income issues when the original order size is not obtainable (i.e., the trade allocation will be made pro-rata based on original order size).

In step 130, the pro-rata share may be compared to a minimum allocation amount and, if the pro-rata amount is greater than the minimum allocation, then an amount approximately equal to the pro-rata share is allocated in step 140. The minimum allocation amount may be specified before the trade is executed. The minimum allocation amount may be adjusted for each executed trade, from time to time, or may remain the same. If a strict pro-rata allocation places some accounts below the minimum allocation amount upon execution, then the size that would otherwise be allocated to accounts below the minimum allocation amount may be reallocated. This reallocation may be effected via an algorithm in amounts approximately equal to the minimum allocation amount for accounts where the original order size is equal to or larger than the minimum allocation. Accordingly, those accounts that were below the minimum and would have received shares under a strict pro-rata allocation (i.e., without giving effect to minimum allocation amounts or round trading lots) may be eligible to receive an allocation under the algorithm (step 150). The probability that a given account is selected to receive an allocation may be proportional to the size of the allocation it would receive under a strict pro-rata allocation. In step 160, a phase I remainder may be calculated as the difference between the pro-rata allocations in step 140 and the executed order size.

FIG. 2 is a table 10 that illustrates an exemplary method for allocating size among different trading accounts according to an embodiment of the present invention. Table 10 includes a block order 12, an executed order 13, a plurality of accounts 14, an order quantity 16, a pro-rata percentage 18, a pro-rata share 20, a phase I remainder 22, a phase II remainder 24, and an allocation probability 26. As shown, block order 12 for 2,710,000 shares is partially filled by an executed order 13 for 750,000 shares. Executed order 13 may be allocated to the plurality of accounts 14 in accordance with a three-phase process, wherein MIN refers to the minimum allocation amount specified:

Phase I: Start
For accounts with pro-rata >MIN, allocate pro-rata.
Phase II: While amount to allocate ≧MIN
For accounts with pro-rata <MIN, allocate MIN to select account(s).
Phase III: While MIN> amount to allocate >0
Distribute remainder to open accounts.

In phase I, each account that a strict pro-rata allocation places at or above MIN may receive an allocation that is roughly equal to its pro-rata share of the size traded. Accordingly, in FIG. 2, only those accounts having a pro-rata share 20 greater than 50,000 will receive a phase I allocation (namely, accounts A through E). A phase I remainder 22 of 113,475 will be allocated in subsequent phases.

Figure 3:
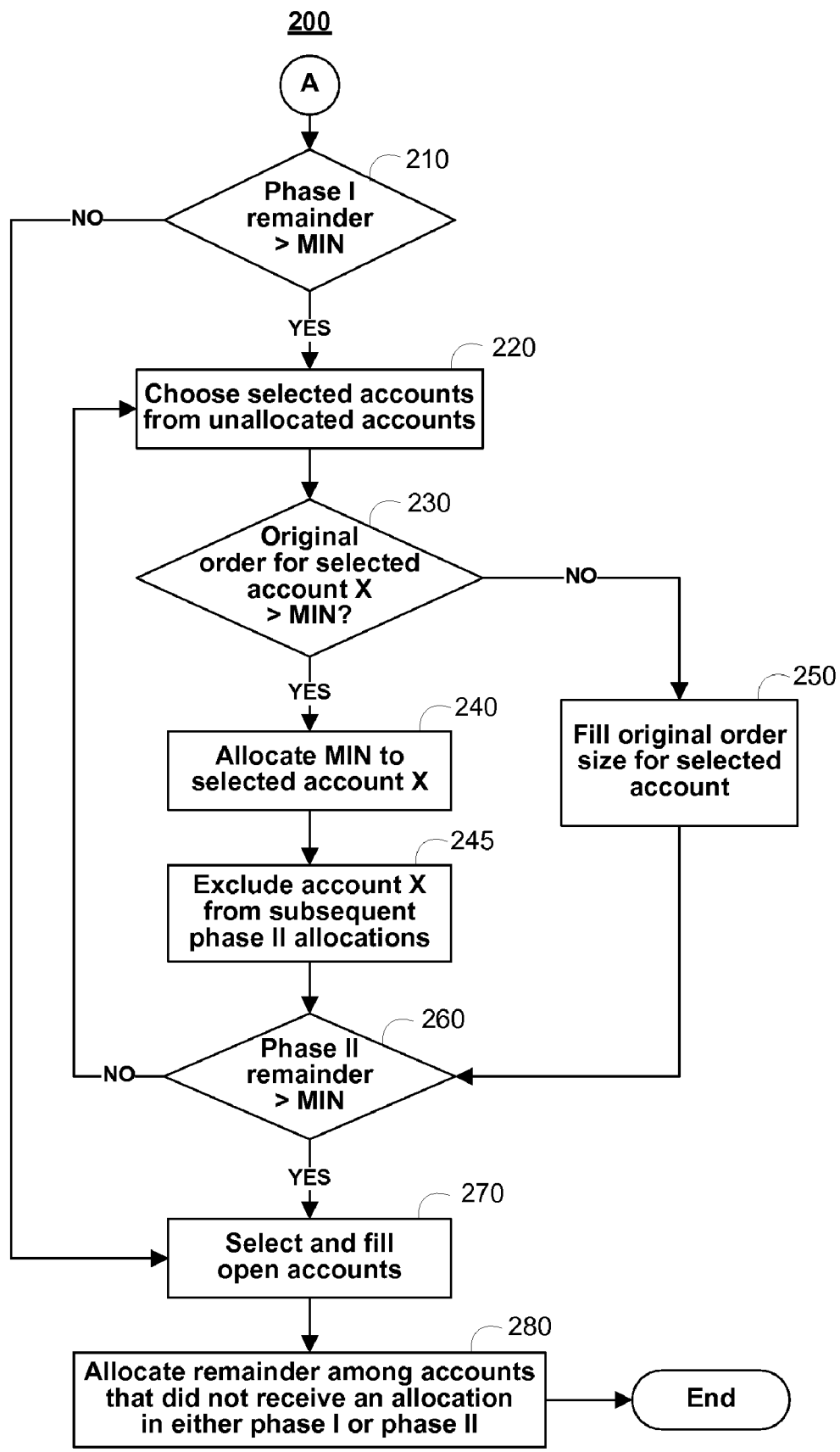
FIG. 3 is a process diagram that illustrates phases II and III of an exemplary method for allocating size among trading accounts according to an embodiment of the present invention.

FIG. 3 is a process diagram that illustrates phases II and III of an exemplary method 200 according to an embodiment the present invention. If the amount to allocate is greater than MIN (step 210), then at least one account that a strict pro-rata allocation places below MIN may be selected to receive a MIN allocation in case the original order size for that account is equal to or larger than MIN (steps 220, 230, and 240). In step 245, any account that receives a phase II allocation is excluded from subsequent phase II allocations repeated in step 260. In case the original order size for the account is less than MIN, then the account may receive an allocation that fills the original order (step 250). The at least one selected account (referred to as the select account(s)) may be chosen based on a partially-randomized process in which the probability that an account is selected is proportional to the size of the allocation it would receive under a strict pro-rata allocation (i.e., the expected value of a strict pro-rata allocation for that account). Phase II may be repeated and allocations may be made pursuant to the above until the traded size that remains unallocated is smaller than MIN (step 260).

Referring again to FIG. 2, table 10 shows that, in phase II, account F is selected based on allocation probability 26 and receives a MIN allocation of 50,000. Allocating 50,000 to account F leaves an unallocated amount of 63,475. The phase II allocation continues with accounts K and G until the unallocated amount is less than MIN. According to an embodiment, accounts that receive an allocation in Phase II may be excluded from subsequent Phase II allocations. For example, in FIG. 2, account F receives an allocation of 50,000 in Phase II and then is excluded from the second and third allocation in Phase II, as indicated by an allocation probability 26 of zero.

In phase III, the traded size that remains unallocated may be distributed among open accounts (i.e., accounts that have not received an allocation that fills the original orders for these accounts)(step 270). The open accounts may be accounts that have been selected in phase II or, as shown in step 280, accounts that have not received an allocation in either phase I or phase II. The unallocated traded size may be used to fill one or more open accounts, distributed among the accounts selected in phase II, used as a basis to allocate newly selected accounts pursuant to the steps described in connection with phase II, or any combination of the same.

For example, if there is enough size to fill any account that remains open after phase II is completed, then this account may be filled. Alternatively, accounts that were selected in phase II and that remain open may be given priority over accounts that have not received any allocation, or vice versa. These select accounts may receive allocations from the remaining traded size on an equal or pro-rata basis. As another example, at least one account that remains open may be selected to receive a portion of the unallocated traded size. The at least one selected account may be chosen based on the same partially-randomized process described above or a strictly-randomized process. The portion that such an account is selected to receive may depend on whether the account can be filled, the number of accounts selected by the process, and/or the number of accounts that remain open.

According to an embodiment, any account that received an allocation in phase II may receive an allocation in phase III. Referring again to FIG. 2, Table 10 shows that accounts F and G receive allocations in phase III. In some embodiments, accounts F and G receive priority in phase III over all open accounts, which may include accounts A through E. In the illustrated embodiment, accounts F and G receive the phase III allocation on a pro-rata basis. For example, account F receives approximately 66% of the phase II remainder 24 (i.e., 0.0369/0.0554≈0.66).

The method for allocating size on a modified pro-rata basis as set forth above minimizes the transaction costs (such as custodial ticket charges) in a manner that is fair and equitable to all trading accounts. This is true because smaller order size accounts are not allocated size each and every time a trade is executed due to the partially-randomized selection process. Instead, some of these accounts are allocated large enough sizes to merit incurring transaction costs in some trades, while they are altogether excluded from other trades. The fact that the process is randomized in part ensures that no account is systematically disadvantaged. Moreover, setting the selection probability to be proportional to the size of a pro-rata allocation results in a distribution that mimics a pro-rata allocation over time.

The allocation algorithm described above may apply to transactions in equity securities in the secondary markets. A similarly-modified pro-rata allocation may apply for purchases in an equity initial public offering ("IPO"). For IPO purchases, trade allocations may be made pro-rata based upon the appropriate asset sizes of the accounts in the aggregate order. The pro-rata allocation may not exceed the share amount specified in the order for that account. If the allocation places some accounts below the minimum lot size of the issue (after share lot rounding), then those accounts may be excluded from the allocation process and the remaining shares may be reallocated proportionally to the accounts whose initial allocation met the minimum lot size. As a result, an account for which an order to purchase IPO shares is placed may receive no shares of that IPO security due to minimum lot sizes and/or relative assets under management for that particular account.

If an allocation places some accounts below the minimum lot size or round trading lot of the issue (after rounding), then all of the instruments that would otherwise be allocated to client accounts below the minimum lot size or round trading lot may be reallocated to the client accounts meeting the minimum amount.

The minimum allocation amount threshold may be disabled from time to time. For example, if the systems supporting the allocation process are unavailable, or if it is reasonably believed that the minimum would not be fair and equitable to all accounts, the minimum allocation amount threshold may be disabled and a strict pro-rata allocation may be applied. Moreover, an exception to the modified pro-rata allocations may be sought in order to comply with regulatory requirements or practices, or when the exception is fair and reasonable to all accounts involved.

The methods for allocating size on a modified pro-rata basis disclosed herein may be implemented in an electronic trading system in which instruments such as the ones described above may be entered into and traded. For example, the process described herein may be implemented through instructions on a computer-readable medium, such as removable or fixed, volatile or non-volatile or permanent or re-writable computer storage media. The computer readable medium may tangibly embody a program, functions, and/or instructions that cause a processor in computing device, such as a workstation and/or server, to operate in a specific and predefined manner as described herein. Those skilled in the art will appreciate, however, that the processes described here, such as those illustrated in FIG. 1 and FIG. 3, may be implemented at any level, ranging from hardware to application software and in any appropriate physical location.

A system for implementing the process described herein may include one or more local or remote user workstations that are connected to a computer network. The network may be linked to a server that processes the transactions, that executes trades, and that is coupled to a back office center that clears the transactions.

The order of execution or performance of the methods illustrated and described herein is not essential, unless otherwise specified. That is, elements of the methods may be performed in any order, unless otherwise specified, and that the methods may include more or less elements than those disclosed herein. For example, it is contemplated that executing or performing a particular element before, contemporaneously with, or after another element is within the scope of the invention.

One of ordinary skill in the art should appreciate that the methods and systems of the present application may be practiced in embodiments other than those described herein. It will be understood that the foregoing is only illustrative of the principles disclosed herein, and that various modifications can be made by those skilled in the art without departing from the scope and spirit of the invention or inventions.

What is claimed is:

1. A method for allocating trades of financial instruments among multiple accounts comprising:
   aggregating orders, wherein each order is associated with an account, and wherein each order has an original order size;
   allocating an executed order based on the aggregated order in a phase I allocation, wherein the phase I allocation is allocated on a pro-rata basis based on the original order size for each account, except for those accounts that would receive an amount less than a minimum allocation;
   allocating, automatically by a computer, a remainder from the phase I allocation in a phase II allocation, wherein the phase II allocation is allocated among selected accounts in an amount equal to the minimum allocation or an amount that fills the original order size;
   repeating the phase II allocation until a remainder from the phase II allocation is less than the minimum allocation; and
   allocating a remainder from the phase II allocation in a phase III allocation according to predetermined criteria.

2. The method of claim 1 wherein the aggregated orders have similar trading criteria.

3. The method of claim 1 wherein the selected accounts are selected based on a partially-randomized process in which the probability that a given account is selected is proportional to the pro-rata basis.

4. The method of claim 1 wherein the phase III allocation is allocated among open accounts.

5. The method of claim 4 wherein the allocation among open accounts is in accordance with the phase II allocation.

6. The method of claim 1 wherein the phase III allocation is allocated among accounts that did not receive an allocation in either the phase I allocation or the phase II allocation.

7. The method of claim 1 wherein the phase III allocation is allocated among accounts selected in the phase II allocation.

8. The method of claim 1 wherein the phase III allocation is allocated so that accounts selected in the phase II allocation and that remain open are given priority.

9. The method of claim 8 wherein the phase III allocation is allocated on a pro-rata basis.

10. The method of claim 8 wherein the phase III allocation is allocated on an equal basis.

11. The method of claim 1 wherein the selected accounts are selected based on a strictly-randomized process.

12. The method of claim 11 wherein the selected account depends on whether an order associated with the selected account can be filled.

13. The method of claim 11 wherein the selected account depends on a quantity of the selected accounts.

14. The method of claim 11 wherein the selected account depends on a quantity of open accounts.

15. The method of claim 1 wherein an account does not receive an allocation in either the phase I allocation, the phase II allocation, or the phase III allocation.

16. The method of claim 1 wherein the phase III allocation is allocated in the best interest of clients associated with the accounts.

17. The method of claim 1 wherein the financial instruments are equity securities, and wherein the phase I allocation, the phase II allocation or the phase III allocation is based on an average price.

18. The method of claim 1 wherein repeating the phase II allocation includes allocating among those accounts that did not receive an allocation in a prior phase II allocation.

19. A non-transitory computer-readable medium storing computer executable instructions, which when executed by a processor, cause the processor to perform a method of allocating trades of financial instruments among multiple accounts, the method comprising:
  aggregating orders, wherein each order is associated with an account, and wherein each order has an original order size;
  allocating an executed order based on the aggregated order in a phase I allocation, wherein the phase I allocation is allocated on a pro-rata basis based on the original order size for each account, except for those accounts that would receive an amount less than a minimum allocation;
  allocating a remainder from the phase I allocation in a phase II allocation, wherein the phase II allocation is allocated among selected accounts in an amount greater than or equal to the minimum allocation or an amount that fills the original order size;
  repeating the phase II allocation until a remainder from the phase II allocation is less than the minimum allocation; and
  allocating a remainder from the phase II allocation in a phase III allocation according to predetermined criteria.

20. A system for allocating trades of financial instruments among multiple accounts comprising:
  a server computer configured to receive an aggregated order that includes multiple accounts, wherein each account has an original order size, and wherein the server computer is configured to receive an executed order based on the aggregated order and to allocate the executed order among the accounts in a phase I allocation on a pro-rata share basis, but only to the accounts having a pro-rata share greater than a minimum allocation, and wherein the server computer is configured to allocate in phase II allocation a remainder from the phase I allocation among a plurality of selected accounts in an amount greater than or equal to the minimum allocation or an amount that fills the original order size, and wherein the server computer is configured to repeat the phase II allocation until a remainder from the phase II allocation is less than the minimum allocation, and wherein the server computer is configured to allocate a remainder from the phase II allocation on a pro-rata share basis.

21. A method for allocating trades of financial instruments among multiple accounts comprising:
  aggregating orders, wherein each order is associated with an account, and wherein each order has an original order size;
  allocating an executed order based on the aggregated order in a phase I allocation, wherein the phase I allocation is allocated on a pro-rata basis based on the original order size for each account, except for those accounts that would receive an amount less than a minimum allocation;
  allocating, automatically by a computer, a remainder from the phase I allocation in a phase II allocation, wherein the phase II allocation is allocated to some but not all of the accounts associated with the aggregated order.

22. The non-transitory computer-readable medium of claim 19 wherein execution of the computer executable instructions by the processor further causes the processor to select the selected accounts based on a partially-randomized process in which the probability that a given account is selected is proportional to the pro-rata basis.

23. The non-transitory computer-readable medium of claim 19 wherein execution of the computer executable instructions by the processor further causes the processor to allocate the phase III allocation among accounts that did not receive an allocation in either the phase I allocation or the phase II allocation.

24. The non-transitory computer-readable medium of claim 19 wherein execution of the computer executable instructions by the processor further causes the processor to allocate the phase III allocation so that accounts selected in the phase II allocation and that remain open are given priority.

25. The non-transitory computer-readable medium of claim 19 wherein execution of the computer executable instructions by the processor further causes the processor to select the selected accounts based on a strictly-randomized process.

26. The non-transitory computer-readable medium of claim 19 wherein execution of the computer executable instructions by the processor further causes the processor to repeat the phase II allocation by allocating among those accounts that did not receive an allocation in a prior phase II allocation.

27. The system of claim 20 wherein the selected accounts are selected based on a partially-randomized process in which the probability that a given account is selected is proportional to the pro-rata basis.

28. The system of claim 20 wherein repeating the phase II allocation includes allocating among those accounts that did not receive an allocation in a prior phase II allocation.

29. The system of claim 20 wherein an account does not receive an allocation in either the phase I allocation, the phase II allocation, or the phase III allocation.

30. The method of claim 21, wherein the phase I allocation or the phase II allocation is based on an average price.

31. The method of claim 21, wherein the account receiving allocations in the phase II allocation are selected based on a partially-randomized process in which the probability that a given account is selected is proportional to the pro-rata basis.

\* \* \* \* \*